United States Patent [19]

Ackeret

[11] Patent Number: 4,702,372
[45] Date of Patent: Oct. 27, 1987

[54] STORAGE CONTAINER FOR COMPACT CASSETTES

[75] Inventor: Peter Ackeret, Kusnacht, Switzerland

[73] Assignee: IDN Inventions and Development of Novelties ag, Fed. Rep. of Germany

[21] Appl. No.: 817,232

[22] Filed: Jan. 8, 1986

Related U.S. Application Data

[63] Continuation of Ser. No. 645,063, Aug. 28, 1984, abandoned.

[30] Foreign Application Priority Data

Aug. 29, 1983 [EP] European Pat. Off. ......... 831084736

[51] Int. Cl.⁴ ..................... B65D 85/672; B65D 85/57
[52] U.S. Cl. .................................. 206/387; 206/309;
    206/444; 220/347; 312/12; 312/15; 312/350
[58] Field of Search ................. 206/387, 444, 309;
    220/347, 348; 312/8–12, 15, 330, 350

[56] References Cited

U.S. PATENT DOCUMENTS 3,642,337  2/1972  Manheim ........................ 206/387
3,899,229  8/1975  Ackeret ........................... 312/111
4,030,601  6/1977  Ackeret ........................... 312/319
4,087,145  5/1978  Weavers .......................... 312/319
4,216,857  8/1980  Huang ............................. 206/387

FOREIGN PATENT DOCUMENTS 0086275   8/1983  European Pat. Off. ........... 206/387
2734788   2/1978  Fed. Rep. of Germany .
3114298  11/1982  Fed. Rep. of Germany ...... 206/387
0862226   9/1981  U.S.S.R. ........................... 206/387

OTHER PUBLICATIONS

Published PCT Application WO83/00768, Mar. 1983.

Primary Examiner—Jimmy G. Foster
Attorney, Agent, or Firm—Chilton, Alix & Van Kirk

[57] ABSTRACT

Cassettes containing recording media, for example audio tape cassettes, are stored on a transport slider which, upon command, may be ejected from a housing to permit removal and use of the cassette. The slider has projections which prevent unwanted rotation of the winding hubs of a stored cassette, the projections being serially arranged along a line parallel to the direction of travel of the slider, and has a long stroke so that both projections are positioned outside of the housing when the slider is in the ejected position.

71 Claims, 13 Drawing Figures

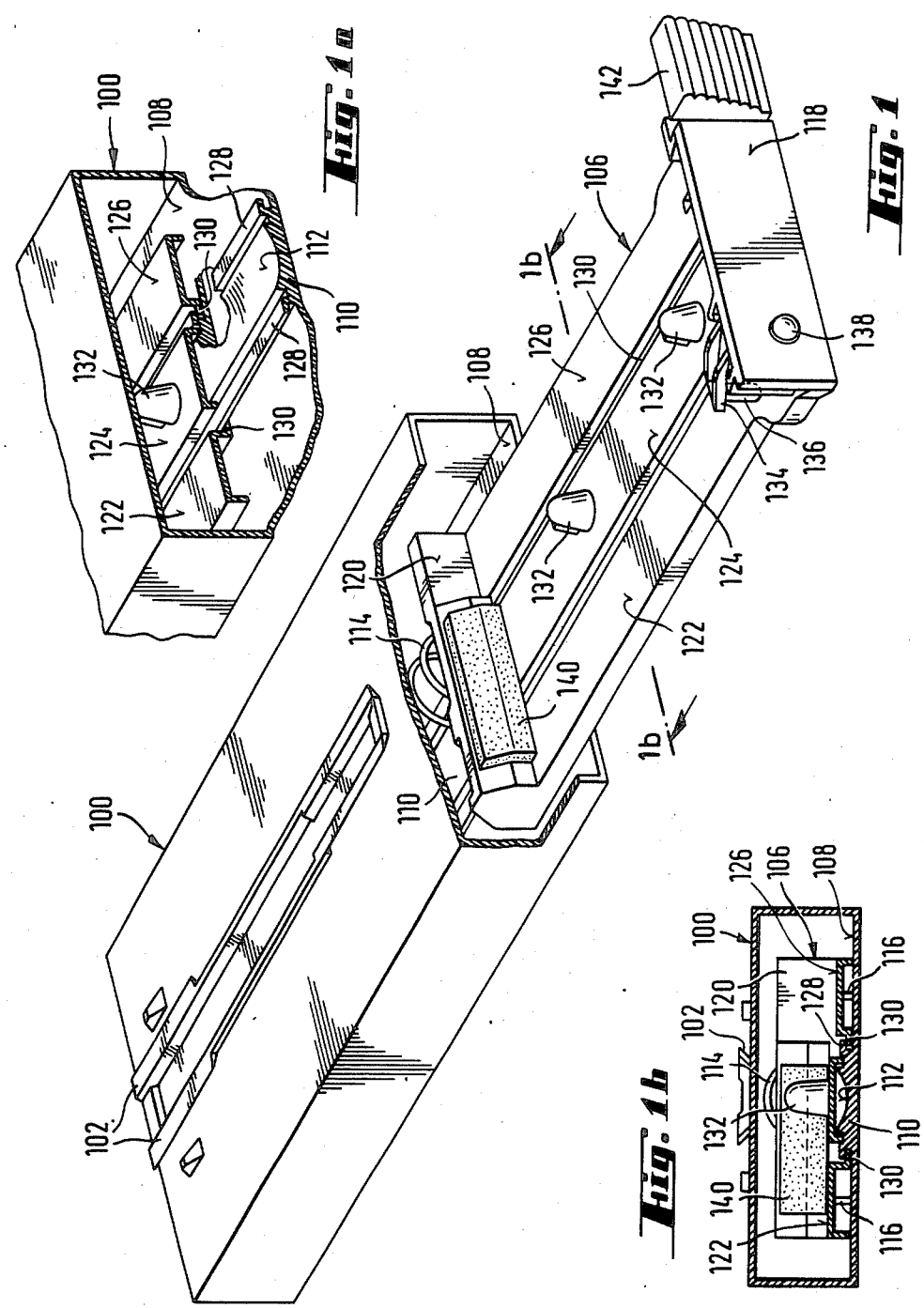

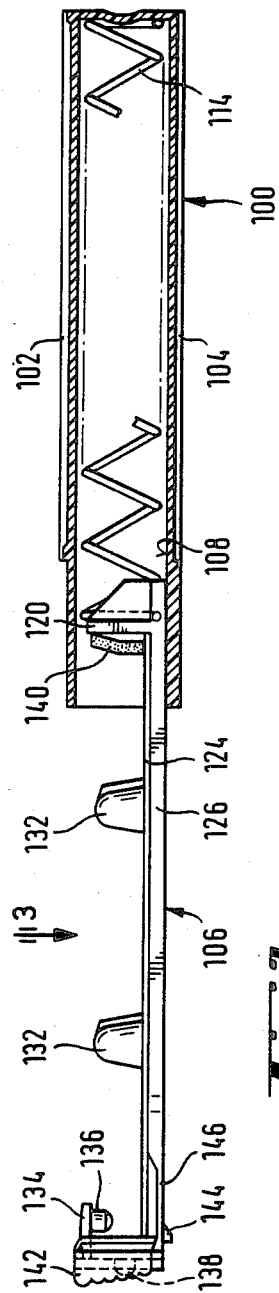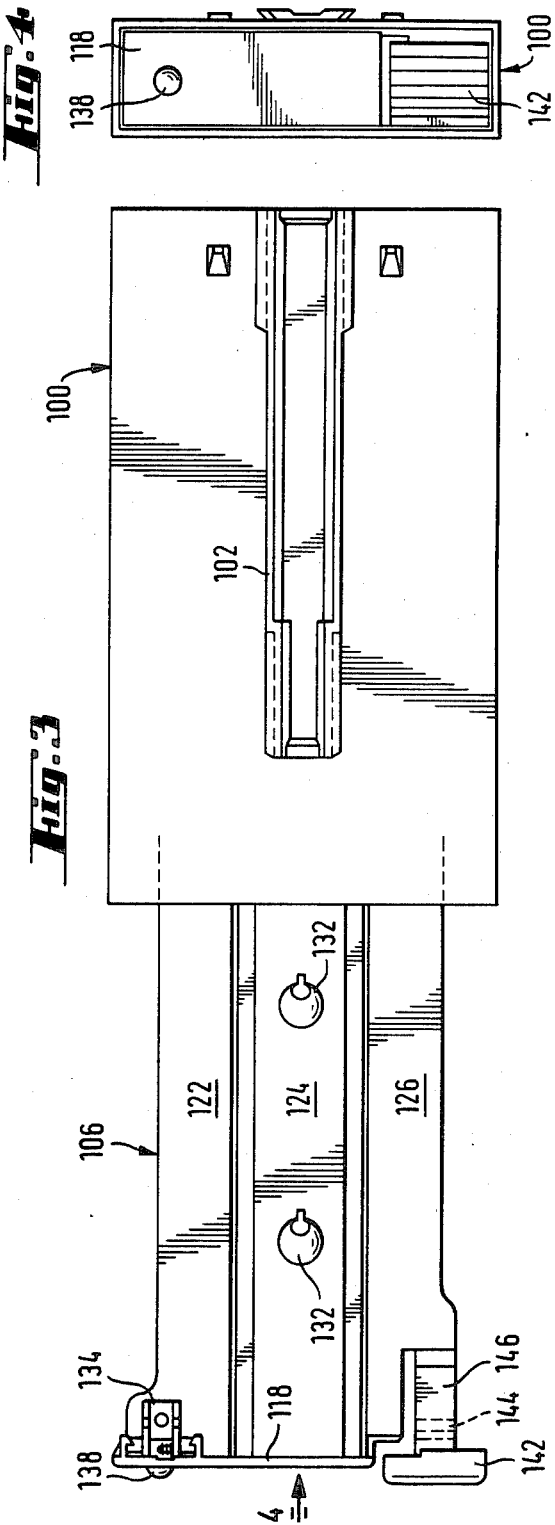

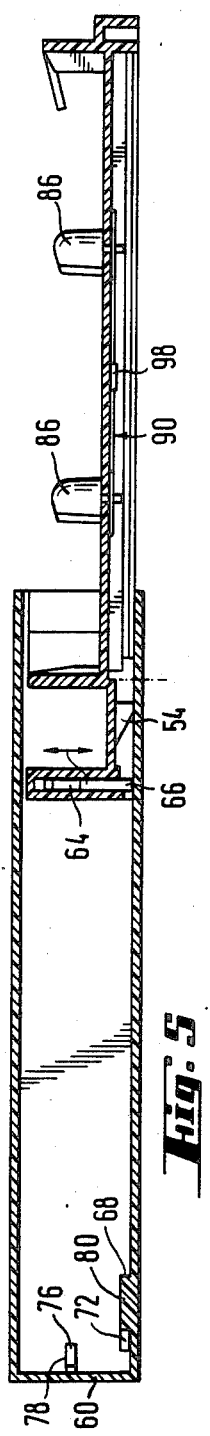
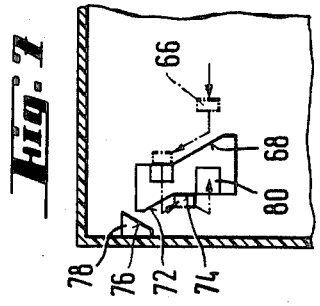
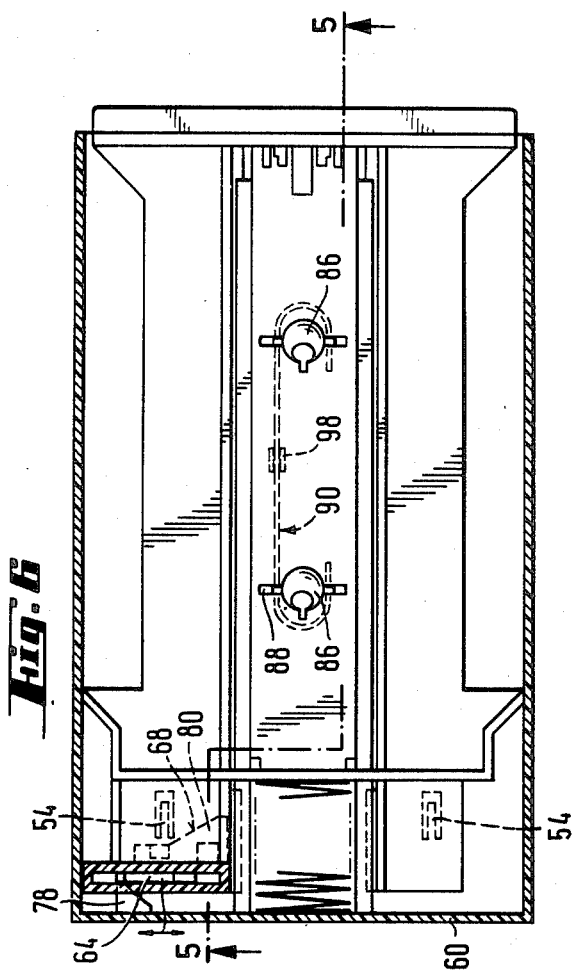

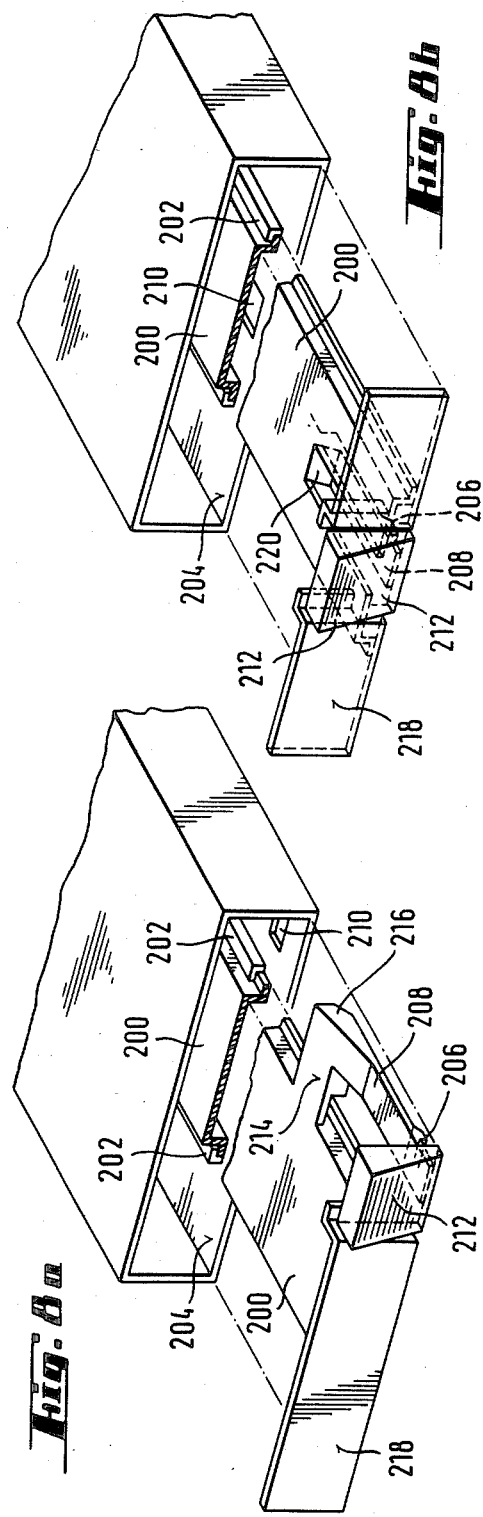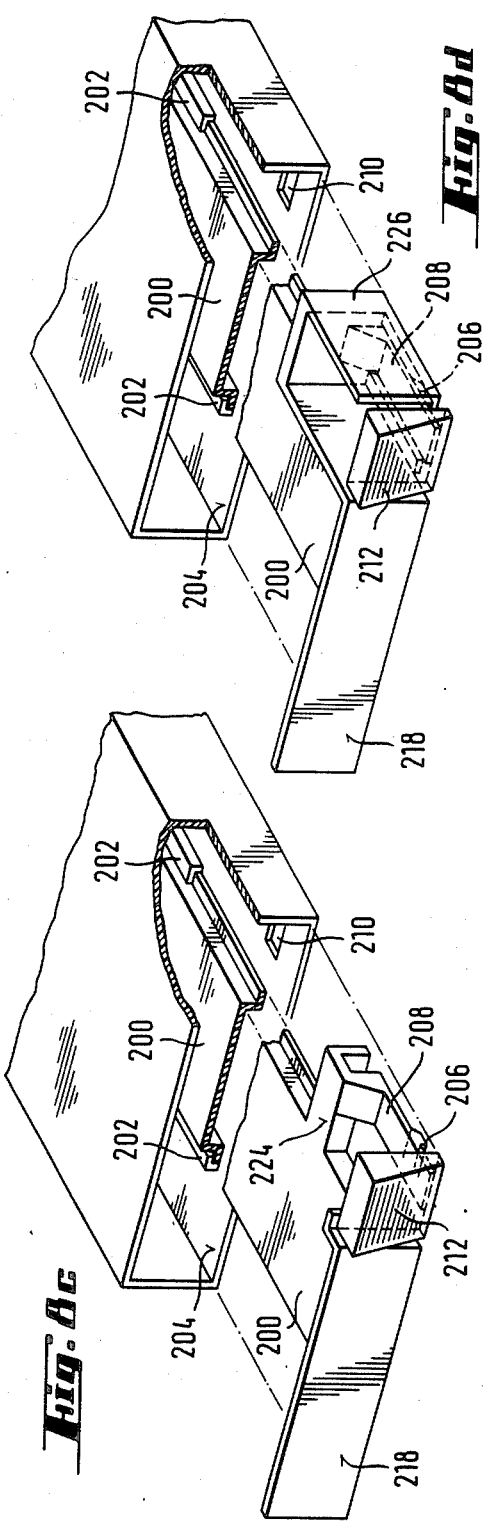

STORAGE CONTAINER FOR COMPACT CASSETTES

This is a continuation of co-pending application Ser. No. 645,063 filed on Aug. 28, 1984, now abandoned.

BACKGROUND OF THE INVENTION (1) Field of the Invention

The present invention relates to the storage, and to the retrieval therefrom, of standard magnetic tape cassettes and particularly to enhancing the utilization of the space available in motor vehicles for the storage of such cassettes. More specifically, this invention is directed to improved storage containers for compact cassettes and especially to storage magazines wherein the transport sliders for the cassettes are characterized by a comparatively long path of movement. Accordingly, the general objects of the present invention are to provide novel and improved methods and apparatus of such character.

(2) Description of the Prior Art

While not limited thereto in its utility, the present invention is particularly well suited for use in the storage of audio tape cassettes in the environment of a motor vehicle. Storage systems for compact, i.e., standard magnetic tape, cassettes which may be installed in the center console of a motor vehicle are known in the art. Typically, the cassettes are supported in such storage systems on transport slider members in such a manner that the narrow side of the cassette, which is intended to be juxtapositioned to the recording head in playback apparatus, is located adjacent to the front wall of the slider member. This cassette storage orientation has previously been employed since, when returning a cassette to storage, it must be placed on the slider member such that projections on the slider will engage the tape winding hubs of the cassette to prevent vibration induced rotation of the winding hubs. When returning a cassette to storage in the prior art, one of its long sides is angled beneath a front edge of a housing and the cassette is then pressed downwardly onto the slider member. Thus, both winding hub engaging projections must be positioned outside of the housing and this could previously be accomplished with what was deemed to be an acceptable amount of slider travel by adhering to the aforementioned cassette orientation.

The cassette storage containers of the prior art can be interlocked with additional containers of identical construction to form blocks and, in the typical motor vehicle installation, a plurality of such blocks would be recessed in an adapter or fitting provided in the central console of the vehicle.

The recess provided in a vehicle console for a cassette storage system will typically have a considerable depth but a relatively small opening, i.e., the opening will have a comparatively small height and width. Previously available cassette storage containers made inadequate use of the available storage depth and, accordingly, the volumetric efficiency of the storage system was poor. This poor volumetric efficiency resulted from the fact, discussed above, that the movement of the cassettes from the storage to the ejected or removal position was in the direction of their short sides. Storage containers for magnetic tape cassettes have not previously been available which had a sufficiently long ejection stroke, i.e., transport slider member travel length, so as to move a cassette in the direction of its longest side and present, outside of the housing, both of the winding hub retaining projections. The foregoing deficiency, i.e., short stroke length, of prior cassette storage containers is, in part, attributable to the fact that, to be economically practical, such storage containers should be comprised of moulded plastic parts. There is an ever present danger of such parts becoming distorted, particularly in the comparatively harsch operating environment of a motor vehicle, whereupon the transport slider member would be unable to move and the possibility of the slider jamming in the housing increases with increased ejection stroke length.

SUMMARY OF THE INVENTION

The present invention overcomes the above-briefly discussed and other deficiencies and disadvantages of the prior art by providing a novel and improved cassette storage technique and apparatus which is characterized by a high degree of reliability in the face of a long transport slider member stroke.

Apparatus in accordance with the present invention comprises a housing, open at one narrow side, and a transport slider member which is movable with respect to said housing from a storage position to an ejected position. The transport slider member has front and rear walls and a base which connects these walls. The apparatus includes an ejection spring which biases the slider member toward the ejected position which is defined by cooperation between stops on the slider member and the housing. The apparatus also includes a manually releasable locking arrangement which permits the transport slider member to be retained in the housing against the bias of the ejection spring. The transport slider also has winding hub retaining projections, for engaging a cassette positioned on the base of the slider member, and these projections are arranged one behind the other in the direction of travel of the slider member. The guide means for the slider member, including portions of the base of the slider member and cooperating components on the bottom of the housing, provide for reliable travel over a long path length and, in a preferred embodiment, also provides support which prevents buckling of the ejection spring.

As a result of the long travel or stroke of the transport slider member of the present invention, a compact cassette positioned thereon can be easily lifted over the front wall of the slider member, i.e., the possibility of interference between the cassette and the housing opening is substantially eliminated since the most rearwardly disposed of the winding hub engaging projections is, with the slider in the ejected position, located forwardly with respect to the front edge of the housing of the storage container. In the preferred embodiment the slide bar for the slider member is provided on or adjacent to the central part of the base of the slider. This is a particularly important advantage since, if lateral guide means were provided at the side edges of the transport slider, there would be increased danger of jamming.

A further particularly important feature of the present invention resides in the location of the ejection spring so that its force is applied at or adjacent to the center of the rear wall of the transport slider. This resultd in minimizing the angular forces applied to the locking mechanism of the assembly when the slider member is in the inserted position. As noted above, economic considerations dictate that the components of the storage system be moulded from plastic and the materials customarily employed are susceptible to cold flow, and thus deformation, when exposed to constant pressure and adverse conditions such as, for example, the high temperature which might be encountered in a closed vehicle.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which:

FIG. 1 is a perspective view, partly in section, of a cassette storage container in accordance with a first embodiment of the present invention;

FIG. 1a is a partial perspective view which illustrates the means for guiding the transport slider member of the apparatus of FIG. 1;

FIG. 1b is a schematic cross-sectional view of the apparatus of FIG. 1 taken in a direction perpendicular to the direction of movement of the slider member;

FIG. is a schematic, cross-sectional side elevation view of the apparatus of FIG. 1;

FIG. 3 is a top plan view of the apparatus of FIG. 1 as schematically depicted in FIG. 2;

FIG. 4 is a front view, rotated by 90°, of the embodiment of FIGS. 1-4;

FIG. 5 is a cross-sectional side elevation view, similar to FIG. 2, depicting a second embodiment of the present invention, FIG. 5 being a view taken along line 5—5 of FIG. 6;

FIG. 6 is a cross-sectional top plan view of the apparatus of FIG. 5 with the transport slider member shown in the inserted position;

FIG. 7 is a partial cross-sectional view, taken in the same direction as FIG. 6, which schematically shows the operation of the locking arrangement of the embodiment of FIGS. 5 and 6; and FIGS. 8a, 8b, 8c, and 8d are partial perspective views which depict various alternative locking systems for use in the present invention.

DESCRIPTION OF THE DISCLOSED EMBODIMENTS

Referring now to FIGS. 1-4, a tape cassette storage container in accordance with the present invention comprises a housing 100. Housing 100 is provided, respectively on the outside of its top and bottom walls, with complementary shaped locking members 102 and 104. This permits a plurality of identical housings 100 to be assembled to form a module or block. A transport slider, indicated generally at 106, is positioned in housing 100 and is capable of movement with respect thereto between an inserted or cassette storage position and the ejected or cassette removal position shown in FIG. 1. When the slider 106 is in the inserted position the cassette will be entirely contained within housing 100 and the open front side of the housing, through which the slider moves, will be covered by a front wall 118 of slider 106.

As may be seen from FIG. 1a, a rail 110 is formed integrally with the floor or base 108 of housing 100. Rail 110 has a central portion 112 which is of arcuate configuration, the radius of this arc being commensurate with that of the compression spring 114 which provides the force for ejecting the slider from the housing. Rail 110 also has, to either side of arcuate portion 112, side edge portions which are configured as shown and which terminate at laterally projecting flanges or guide bars 128. A pair of grooves 115 are also formed in the base 108 of housing 100, these grooves being displaced outwardly from and being oriented parallelly with respect to rail 110. Stop members 116, formed integrally with and extending downwardly from the base of slider 106, run in grooves 115. The grooves 115 terminate short of the front edge of housing 100. The cooperation between the stops 116 and grooves 115 limits the motion of slider 106 in the ejection direction. The stops 116 can be seen by reference to FIG. 1b.

The slider 106 comprises a front wall 118, a rear wall 120 and base bottom or plates 122, 124 and 126 which interconnect the front and rear walls. The base plates 122, 124 and 126, as may be seen from FIG. 1a, each have a generally inverted U-shaped cross-sectional profile. A pair of parallel slots are defined by the spacing between the centermost base plate 124 of the slider and the two outwardly disposed plates 122 and 126. These parallel slots begin immediately behind the front wall 118 of the slider and extend outwardly past the rear wall 120. Each of these parallel slots has a cross-section that is complementary in shape to the profile of the laterally projecting guide bars 128 of rail 110 whereby these rails will be engaged in the slots. Additionally, the slider base plates 122 and 126 have, as indicated at 130, inwardly directed flanges at the ends of the legs thereof which are positioned adjacent to central base plate 126. The flanges 130 are received under the bars 128 of rail 110 and thus further aid in the establishment of a secure guiding relationship between guide rail 110 and the slider 106. It should be noted that the forming of the base plates of slider 106 with an inverted U-shaped profile improves the flexural strength of the slider 106.

Continuing to refer to FIG. 1a, it is to be noted that the upper side of base plate 122 of slider 106 is disposed at a higher level, relative to the plane of the base 108 of the housing, than is the upper side of the opposite base plate 126. This offsetting of the heights of the support surfaces of the base plates constitutes allowance for the fact that, in the region of the face which is opposed to the tape head, most magnetic tape cassettes have a thickened portion with a trapazoidal outline. Thus, when a cassette is installed on slider 106 this thickened portion will rest on the top of base plate 126.

The winding hub retaining projections 132, i.e., the projections on the slider 106 which engage and prevent undesired rotation of the winding hubs of a tape cassette, are formed integrally with the upper side of the central base plate 124 in the embodiment of FIGS. 1-4.

A push lever 134 is hinged to the front wall 118 of slider 106. Push lever 134 is connected to an indicator button 136, which may be seen from FIG. 2. When a cassette is inserted on slider 106 the push lever 134 will be pivoted downwardly so that the indicator button 136 will be visable through a window 138 provided in slider front wall 118. Accordingly, it is possible to determine, at a glance and from the outside, which containers in a stacked block of containers have been loaded with a cassette. Resilient biasing means will typically be provided to return push lever 134 to the position shown in FIG. 2 when a cassette is removed from slider 106.

To compensate for the dimensional tolerances of the cassettes and the storage containers, a resilient foam cushion 140 is adhesively secured to the forwardly facing side of the rear wall 120 of slider 106. The provision of the cushion 140 insures that the indicator, including push lever 134, is reliably actuated and further assures that a cassette positioned on the slider will not rattle when, for example, the container is conveyed in a motor vehicle.

In the embodiment of FIGS. 1–4 a portion 142 of the front wall 118 of the slider 106 functions as a release button to unlock the slider 106 and permit its ejection. The release button 142 is coupled to a locking hook 144, shown in FIG. 2, so that upward finger pressure applied to button 142 will cause hook 144 to be lifted out of a recess or aperture, not shown, provided in the base of housing 100. With the locking hook 144 disengaged from the cooperating recess in the base of the housing, the ejection spring 114 can push the slider outwardly to the position shown in FIGS. 1 and 2. The locking hook 144 will be mounted on or integral with a leaf spring 146, see FIG. 3, which is itself formed integrally with the base plate 126 of slider 106. Because of its shape, the hook 144 will be cammed upwardly by the lower front edge of housing 100 during insertion of slider 106 into the housing.

Use of the storage container of the embodiment of FIGS. 1–4 requires that the cassette be properly oriented. That is, standard magnetic tape cassettes are assymetrical in that a plane defined by the axes of the tape winding hubs is not equally positioned from the opposite longer sides of the cassette. In the embodiment of FIGS. 1–4 the positioning of the retaining projections 132 takes this lack of symmetry into account. Thus, if an attempt is made to insert a cassette the wrong orientation, the cassette will project outwardly from one side of the slider and, because the thickened portion thereof is not resting on the lower support surface defined by base plate 126, one side of the cassette will be too high. Accordingly, it will be impossible to insert the slider into the housing. The embodiment of FIGS. 5–7 takes into account the asymmetric construction of the cassette and frees the user from the need to pay attention to the orientation of a cassette to be placed in storage.

Referring now to FIGS. 5–7, only those components which differ from corresponding elements of the embodiment of FIGS. 1–4 will be described. It is initially to be noted that each of the retaining projections 86 are shaped at their upper ends so as to cooperate with the winding hubs of a tape cassette in such a manner that a wedging action, and resultant force, will be generated. Each of projections 86 also includes an extension or foot which extends through a slot 88 in the central base plate of the slider, the slots 88 being parallel. The extensions of the projections 86 are captured beneath the slider base plate and interconnected by means of a spring, indicated generally at 90, which is supported by a bracket 98 located intermediate slots 88. Accordingly, when the above-mentioned force resulting from wedging action is produced, the projections 86 may move transversely with respect to the direction of motion of the slider thereby permitting the cassette to move downwardly into its storage position on the slider, the storage position not interfering with movement of the slider into the housing. The arrangement of the embodiment of FIGS. 5–7, i.e., the provision for lateral movement of the retaining projections 86, takes into account the fact that the asymmetry of a standard magnetic tape cassette is sufficiently small that the hubs 86 will be in partial registration with the winding hubs of a cassette regardless of which of the two possible orientations is assumed by that cassette upon initial placement on the slider. The cassette must, of course, be centered on the slider for the embodiment of FIGS. 5–7 to function properly and this centering is accomplished by the provision of lateral funnel-like guide faces at the inwardly disposed end of the slider. It is also to be noted that the two outer base plates of the slider are, in the embodiment of FIGS. 5–7, cut away so that the generally trapazoidal shaped thickened portion of a standard compact cassette will be unsupported and thus the cassette will lie flat regardless of which direction the side thereof which is opposed to the tape head faces.

As can be seen in FIG. 5, a stop 54 is provided which limits the ejection travel of the slider at a position where the above-mentioned funnel-shaped cassette guide opening is approximately flush with the open end of the housing. As may be seen from FIG. 6, the two outer base plates of the slider extend beyond the rear wall thereof to insure reliable guidance in spite of the long ejection stroke. This extra length of the base plates also permits the use of a locking device which requires space within the housing. This locking device, which will be described briefly below, includes the elements indicated at 64, 66, 76 and 80.

To now discuss the locking arrangement of the embodiment of FIGS. 5–7, a "cage" is formed integrally with the slider and a catch member 64 is mounted for movement in this cage transversely to the direction movement of the slider and also for rotation. The rotation results in the upward movement of a catch projection 66, such upward movement being resisted by the bias of a spring, not shown. A cam plate 80 is formed integrally with the base of the housing, the shape of this cam plate being best seen from FIG. 7, and a control bracket 78, formed integrally with the back wall 60 of the housing, extends into the housing. The relative positioning of the cam plate 80 and control bracket 78 may be seen from FIG. 7. When the slider member is pushed inwardly the catch projection 66 of catch 64 will contact a first guide edge 68 of the cam plate 80. Continued insertion of the slider will result in movement of the projection 66, and thus catch 64 in the direction represented by the arrows on FIG. 7. Thus, the catch 64 will be translated and, when the projection 66 comes into alignment with a first ramp 70, the catch will be pivoted and the projection 66 will move up and over the cam plate 80. As the insertion of the slider continues, the projection 66 will drop down behind cam plate 80. The insertion movement of the slider will be arrested by its coming into contact with a stop, not shown. If the slider is then released, the catch projection 66 will, under the influence of the ejection spring, move in the direction of the arrow along a second guide edge 72 of the cam plate until it stops at a detent edge 74. Cooperating flat surfaces of the projection 66 and the detent edge 74, under the influence of the ejection spring, will lock the slider member in this inserted position. If it is desired to again eject the slider, the front plate thereof is pressed inwardly until the slider again contacts the stop. During this inward motion a control edge 76 of control bracket 78 will contact an edge of catch 64 and will translate catch 64 until projection 66 is in registration with a second, forwardly directed ramp on cam plate 80. Thereafter, under the influence of the ejection spring, the catch projection 66 will move upwardly and over the surface of cam plate 80 and, when projection 66 drops down in front of plate 80, the unlocking operation will be completed and there will be no impediment to the spring biased movement of the slider until such movement is arrested by the action of the stop lugs 54. The structure and operation of the locking mechanism briefly described above is discussed in more detail in contemporaneously filed application serial number entitled "RECORDING MEDIA STORAGE APPARATUS AND TECHNIQUE". The construction of slider members having movable tape winding hub engaging projections, such as the projections 86 of the embodiment of FIGS. 5-7, is described in more detail in contemporaneously filed application serial number entitled "CONTAINER FOR STORING MAGNETIC TAPE CASSETTES".

In the embodiment of FIGS. 1-4, the slider is guided by cooperation between the two flanges 130 of the outer base plates of the housing, the laterally projecting bars 128 of rail 110 and the guide slots defined by the spacing between the slider base plates. In addition, one of the slider base plates, specifically the base plate 126, forms the locking mechanism consisting of button 142, hook 144 and spring 146. FIGS. 8a-8d depict embodiments which are similar to that of FIGS. 1-4 but in which the base of the slider is defined by a single base plate member 200. The plate member 200 has a generally U-shaped profile with projections extending outwardly in opposite directions from the ends of the legs of the "U". A guide track for the base plate 200 is defined by a pair of L-shaped guide rails 202 which are preferably formed integrally with the base 204 of the housing. Thus, the outwardly extending flanges of base plate 200 fit under the L-shaped rails 202 with sufficient clearance being provided to permit sliding movement of the thus captured base plate. Each of FIGS. 8a, 8b, 8c and 8d shows a different technique for locking and unlocking the slider with respect to the housing. In each alternative a locking hook 206, extending from a leaf spring 208, engages a recess 210 in the base 204 of the housing. Also, in each embodiment, an unlocking button 212 connected to the leaf spring 208 controls the unlocking operation. It is further to be noted that in each embodiment all of the components which move with the slider are injection molded as a single piece.

In the emnbodiment of FIG. 8a, a cross-piece 214 projects laterally from the base plate 200 and extends over one of the rails 202. The cross-piece 214 is provided with a thickened portion 216 which deformation of the leaf spring 208 from being transmitted to the base plate.

In the embodiment of FIG. 8b, the hook, leaf spring and unlocking button are arranged centrally in the front end wall 218 of the slider. The leaf spring 208 is mounted on a thickened block 220 formed integrally with the underside of the base plate so that the underside of the leaf spring is aligned with the base of the housing.

In the embodiment of FIG. 8c a cross-piece similar to the cross-piece 214 of the embodiment of FIG. 8a is provided. However, in the arrangement of 8c the cross-piece 224 is hollow in a direction transverse to the direction of motion of the slider and is resistent to bending and torsion. In order that the slider can be pushed into the housing, one of the guide rails 202 is shorter than the other.

In the embodiments of FIGS. 8a-8c, dust can penetrate between the front end wall of the slider member and the unlocking button 212. Such dust penetration is not possible in the arrangement of FIG. 8d because the unlocking button is formed as a box-shaped projection 226 which is integral with the front end wall 208 of the slider. The external wall of the projection 226, with the slider inserted, contacts the side wall of the housing.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. Apparatus for the storage of cassettes containing recording media comprising:

a housing, said housing being open at one narrow side and having a floor, said housing open side defining a plane which is generally transverse to said floor, said housing including a plurality of internal guide rails which are integral with said floor, said guide rails extending in a direction which is generally transverse to said plane, said guide rails cooperating with said floor to define open-sided guide channels;

a slider member, said slider member having a front wall, a rear wall and a bottom which extends between said front and rear walls, at least the central part of the bottom of said slider member having an inverted U-shaped profile, said slider member bottom further having plural guide bars which are vertically displaced from and extend generally parallel to the base of said U-shaped portion of said slider member bottom, said guide bars being received in said guide channels and being overlapped by said housing guide rails whereby said slider member is guided for movement relative to said housing;

spring means for biasing said slider member in the direction of said housing open side;

stop means for limiting the motion of said slider member in the direction of said spring means bias;

manually releasable locking means for retaining said slider member in said housing against the bias of said spring means; and retaining projections extending from said central part of said bottom of said slider member in a direction which is away from said housing floor, said retaining projections being sized and shaped to receive and lock against rotation the winding hubs of a recording media cassette inserted in said slider member, said projections being arranged one behind the other in the direction of movement of the slider member, the length of said guide rails and guide bars and the position of said stop means being selected such that both of said retaining projections are displaced outwardly with respect to said plane when said slider member is positioned at its limit of movement under the influence of said biasing spring means.

2. The apparatus of claim 1 wherein said slider member bottom further comprises second and third parts, said second and third parts being positioned to either side of and displaced from said central part, the space between said central part and each of said second and third parts of said slider member bottom defining a clearance, said guide bars extending into said clearances.

3. The apparatus of claim 2 wherein said second and third parts each have an inverted generally U-shaped profile and wherein said guide bars are integral with ends of legs of said second and third U-shaped parts of said slider member bottom.

4. The apparatus of claim 2 wherein said locking means comprises catch means integral with said housing and hook means carried by said slider member for engagement with said catch means, said locking means further comprising button means operatively coupled to said hook means for causing release of said hook means for said catch means, said button means and hook means being formed integrally with one of said second and third parts of said slider member bottom.

5. The apparatus of claim 2 wherein the slider member is designed to accommodate a cassette having a first portion of maximum thickness in the region where the recording media is accessed for recording/playback, the remainder of the cassette being of lesser thickness, and wherein one of said second or third side parts of said slider member bottom is designed to accommodate the said first portion of the cassette.

6. The apparatus of claim 2 further comprising:
means for providing an indication of whether a cassette is positioned on said slider member, said indication providing means being mounted on said slider member and being actuated by the insertion of a cassette thereon.

7. The apparatus of claim 1 wherein said spring means comprises a helical pressure spring and wherein said housing floor includes a centrally located projection extending inwardly and upwardly therefrom, said projection having a partially concave profile which faces away from the floor of the housing, said spring being at least in part supported in said concave profile, said guide rails being integral with and extending outwardly from said projection.

8. The apparatus of claim 7 wherein said slider member bottom further comprises second and third parts having an inverted U-shaped profile, said second and third parts being positioned to either side of and displaced from said central part, the space between said central part and each of said second and third parts of said slider member bottom defining a clearance, said guide bars extending into said clearances.

9. The apparatus of claim 8 wherein said guide bars are integral with ends of legs of said second and third U-shaped parts said slider member bottom.

10. The apparatus of claim 1 wherein said guide bars are integral with and extend from the free ends of the legs of said U-shaped central part of said slider member bottom.

11. The apparatus of claim 10 further comprising:
means for providing an indication of whether a cassette is positioned on said slider member, said indication providing means being mounted on said slider member and being actuated by the insertion of a cassette thereon.

12. The apparatus of claim 11 wherein said locking means comprises catch means integral with said housing and hook means carried by said slider member for engagemet with said catch means, said locking means further comprising a release button operatively connected to said hook means, the application of force to said button causing release of said hook means from said catch means, said button and hook means being integral with said central part of said slider member bottom.

13. The apparatus of claim 1 wherein said guide bars extend from the front wall of said slider member through the rear wall thereof.

14. The apparatus of claim 1 wherein said locking means comprises cooperating hook and catch means, said locking means further comprising a release button operatively connected to said hook means for causing release of said hook means from said catch means.

15. The apparatus of claim 14 wherein said release button and hook means are integral with said central part of said slider member bottom.

16. The apparatus of claim 15 wherein a cross-piece extends from the central part of said slider member bottom in a direction which is generally transverse to the direction of motion of said slider member, said release button and hook means being integral with said cross-piece.

17. The apparatus of claim 1 wherein the cassette to be stored has a first portion of maximum thickness in the region thereof through which the recording media is accessed for recording/playback, and wherein said central part of the bottom of the slider member is designed to accommodate the portion of the cassette which is thinner than the said first portion hereof.

18. The apparatus of claim 1 further comprising:
means for providing an indication of whether a cassette is positioned on said slider member, said indication providing means being mounted on said slider member and being actuated by the insertion of a cassette thereon.

19. The apparatus of claim 1 wherein said slider member bottom further comprises at least a second part which extends generally parallel to said central part between said front and rear walls.

20. The apparatus of claim 19 wherein the base portion of said U-shaped central part of said slider member bottom and said second part of said bottom each define a plane which is generally parallel to the floor of said housing, the plane defined by said second part being closer to said floor than the plane defined by said base of said U-shaped part.

21. Apparatus for the storage of cassettes containing recording media comprising:
a housing, said housing being open at one narrow side and having a floor, said housing open side defining a plane which is generally transverse to said floor, said housing including a pair of internal guide rails which are integral with said floor, said guide rails extending in a direction which is generally transverse to said plane, said guide rails cooperating with said floor to define open-sided guide channels;
a slider member, said slider member having a front wall, a rear wall and a bottom which extends between said front and rear walls, said slider member bottom comprising a central portion having an inverted U-shaped profile, and lateral portions spaced from said central portion by slots defined by substantially parallel edges of said central portion and of each of said lateral portions, said guide rails extending into said slots, said slider member further comprising a pair of guide bars disposed at said edges of said lateral portions, said guide bars being received in said guide channels and overlapped by said housing guide rails whereby said slider member is guided for movement relative to said housing;
spring means for biasing said slider member in the direction of said housing open side;
stop means for limiting the motion of said slider member in the direction of said spring means bias;
manually releasable locking means for retaining said slider member in said housing against the bias of said spring means; and
retaining projections extending from said central portion of said bottom of said slider member in a direction which is away from said housing floor, said retaining projections being sized and shaped to receive and lock against rotation the winding hubs of a recording media cassette inserted in said slider member, said projections being arranged one behind the other in the direction of movement of the slider member, the length of said guide rails and guide bars and the position of said stop means being selected such that both of said retaining projections are displaced outwardly with respect to said plane when said slider member is positioned at its limit of movement under the influence of said biasing spring means.

22. The apparatus of claim 21 wherein said locking means comprises a latch and a cooperating indentation, said latch being carried by said slider member and said indentation being provided on said housing, said locking means further comprising a key for manually releasing said latch from said indentation, said key being integrally formed with one of said slider member lateral bottom portions.

23. The apparatus of claim 21 wherein each of said slider member lateral portions has an inverted U-shaped profile, said guide bars extending from at least one free U-end of each side portion parallel to the U-base thereof.

24. The apparatus of claim 23 wherein said central portion and said lateral portions of said slider member bottom each have plane surfaces parallel to said housing floor, said plane surfaces being defined by the bases of said U-shaped profiles, said central portion surface being spaced from said housing floor by a first distance, at lease one of said lateral portion surfaces being spaced from said housing floor by a second distance, said first distance exceeding that of said second distance by an amount commensurate with a thickened lateral portion of a compact cassette to be stored in said apparatus.

25. The apparatus of claim 21 wherein one of said slider member lateral portions is designed to accommodate the thickened portion of a compact cassette in the region of the face of the compact cassette which is located opposite and adjacent to a recording head when the cassette is in use.

26. The apparatus of claim 21 wherein said spring means comprises a helical compression spring and spring guide means integral with said housing, said spring guide means being positioned so as to be disposed between said central portion of said slider member bottom and said housing floor.

27. Apparatus for the storage of cassettes containing recording media comprising:
a housing, said housing being open at one narrow side and having a floor, said housing open side defining a plane which is generally transverse to said floor, said housing including a pair of internal guide rails which are integral with said floor, said guide rails extending in a direction which generally transverse to said plane, said guide rails cooperating with said floor to define open-sided guide channels:
a slider member, said slider member having a front wall, a rear wall and a bottom which extends between said front and rear walls, said bottom having a generally inverted U-shaped profile with a base portion and a pair of legs extending therefrom, said legs having free ends, said bottom being substantially narrower then said housing floor in a direction transverse to said guide rails, said slider member further comprising guide bars extending from the said free ends of said legs so as to be generally parallel to said base portion and being received in said guide channels and overlapped by said housing guide rails whereby said slider member is guided for movement relative to said housing;
spring means for biasing said slider member in the direction of said housing open side;
stop means for limiting the motion of said slider member in the direction of said spring means bias;
retaining projections extending from said bottom of said slider member in a direction which is away from said housing floor, said retaining projections being sized and shaped to receive and lock against rotation the winding hubs of a recording media cassette inserted in said slider member, and projections being arranged one behind the other in the direction of movement of the slider member, the length of said guide rails and guide bars and the position of said stop means beng selected such that both of said retaining projections are displaced outwardly with respect to said plane when said slider member is positioned at its limit of movement under the influence of said biasing spring means; and
manually releasable locking means for retaining said slider member in said housing against the bias of said spring menas, said locking means comprising;
a latch element carried by said slider member;
an indentation on said housing, said indentation cooperating with said latch element;
a key forming an integral part of said slider member and disposed in the front wall thereof, said key and said latch element being disposed in a central symmetry plane of said slider member.

28. The apparatus of claim 27 wherein the width of said slider member bottom is selected such that a space which accommodates the thickened portion of a compact cassette in the region of the cassette which is adjacent and opposite to a recording head when the cassette is in use is provided at least at one side of said bottom.

29. The apparatus of said claim 27 wherein said slider member bottom has a plane surface parallel to said housing floor, said plane surface being spaced from said housing floor.

30. The apparatus of claim 29 wherein said spring means comprises a helical compression spring and spring guide means integral with said housing, said spring guide means being positioned so as to be disposed between said bottom of said slider member and said housing floor.

31. The apparatus of claim 30 wherein the width of said slider member bottom is selected such that a space which accommodates the thickened portion of a compact cassette in the region of the cassette which is adjacent and opposite to a recording head when the cassette is in use is provided at least at one side of said bottom.

32. The apparatus of claim 27 wherein said spring means comprises a helical compression spring and spring guide means integral with said housing, said spring guide means being positioned so as to be disposed between said bottom of said slider member and said housing floor.

33. Apparatus for the storage of cassettes containing recording media comprising:
a housing, said housing being open at one narrow side and having a floor, said housing open side defining a plane which is generally transverse to said floor, said housing including a pair of internal guide rails which are integral with said floor, said guide rails extending in a direction which is generally transverse to said plane, said guide rails cooperating with said floor to define open-sided guide channels;

a slider member, said slider member having a front wall, a rear wall and a bottom which extends between said front and rear wall, said bottom being substantially narrower than said housing floor in a direction transverse to said guide rails and having a generally inverted U-shaped profile with a base portion and a pair of legs extending therefrom, said legs terminating at free ends, said slider member further comprising guide rails extending from said free ends of said legs so as to be generally parallel to said base portion of said U-shaped profile, said guide bars being received in said guide channels and overlapped by said housing guide rails whereby said slider member is guided for movement relative to said housing;

spring means for biasing said slider member in the direction of said housing open side;

stop means for limiting the motion of said slider member in the direction of said spring means bias;

retaining projections extending from said bottom of said slider member in a direction which is away from said housing floor, said retaining projections being sized and shaped to receive and lock against rotation the winding hubs of a recording media cassette inserted in said slider member, said projections being arranged one behind the other in the direction of movement of the slider member, the length of said guide rails and guide bars and the position of said stop means being selected such that both of said retaining projections are displaced outwardly with respect to said plane when said slider member is positioned at its limit of movement under the influence of said biasing spring means; and manually releasable locking means for retaining said slider member in said housing against the bias of said spring means, said locking means including a latch member integrally formed with said slider member and a cooperating housing indentation, said locking means further including a manually operable key integrally formed with said slider member and adapted to release said latch member from said indentation, said key being disposed adjacent one lateral end of said slider member front wall and being connected to said slider member bottom by means of a cross-piece extending across said guide rails.

34. The apparatus of claim 33 wherein said latch member and said key form an integral subassembly, said subassembly being connected by said cross-piece to said slider member bottom.

35. The apparatus of claim 33 wherein the width of said slider member bottom is selected such that a space which accommodates the thickened portion of a compact cassette in the region of the cassette which is adjacent and opposite to a recording head when the cassette is in use is provided at least at one side of said bottom.

36. The apparatus of claim 33 wherein said slider member bottom has a plane surface parallel to said housing floor, said surface being spaced from said housing floor.

37. The apparatus of claim 36 wherein said spring means comprises a helical compression spring and spring guide means integral with said housing, said spring guide means being positioned so as to be disposed in the space between said slider member bottom and said housing floor.

38. The apparatus of claim 37 wherein the width of side slider member bottom is selected such that a space which accommodates the thickened portion of a compact cassette in the region of the cassette which is adjacent and opposite to a recording head when the cassette is in use is provided at least at one side of said bottom.

39. The apparatus of claim 33 wherein said spring means comprises a helical compression spring and spring guide means integral with said housing, said spring guide means being positioned so as to be disposed between said slider member bottom and said housing floor.

40. The apparatus of claim 33 wherein said cross-piece is of torsion-resistant configuration.

41. Apparatus for the storage of cassettes containing recording media comprising;

a housing, said housing being open at one narrow side and having a floor, said housing open side defining a plane which is generally transverse to said floor, said housing including a pair of internal guide rails which are integral with said floor, said guide rails extending in a direction which is generally transverse to said plane, said guide rails cooperating with said floor to define open-sided guide channels;

a slider member, said slider member having a front wall, a rear wall and a bottom which extends between said front and rear walls, said bottom being substantially narrower than said housing floor in a direction transverse to said rails and having a generally U-shaped profile with a base portion and a pair of legs extending therefrom, said legs having free ends, said slider member further comprising guide bars extending from said free ends of said legs so as to be generally parallel to said base portion, said guide bars being received in said guide channels and overlapped by said housing guide rails whereby said slider member is guided for movement relative to said housing;

spring means for biasing said slider member in the direction of said housing open side;

stop means for limiting the motion of said slider member in the direction of said spring means bias;

retaining projections extending from said bottom of said slider member in a direction which is away from said housing floor, said retaining projections being sized and shaped to receive and lock against rotation the winding hubs of a recording media cassette inserted in said slider member, said projections being arranged one behind the other in the direction of movement of the slider member, the length of said guide rails and guide bars and the position of said stop means being selected such that both of said retaining projections are displaced outwardly with respect to said plane when said slider member is positioned at its limit of movement under the influence of said biasing spring means; and manually releasable locking means for retaining said slider member in said housing against the bias of said spring means, said locking means including:

a latch member integrally formed with said slider member;

an indentation in said housing positioned to be engaged by said latch member; and a key integrally formed with said slider member and adapted to release said latch member from sad indentation upon manual actuation, said key being disposed at one lateral end of said slider member front wall, said key being connected to said slider member bottom by means of a cross-piece, one of said housing guide rails and a slider guide bar adjacent to said cross-piece providing a clearance where said cross-piece extends transversely thereto.

42. Apparatus as defined in claim 41 wherein said latch member and said key form an integral subassembly, said subassembly being connected by said cross-piece to said slider member bottom.

43. The apparatus of claim 41 wherein the width of said slider member bottom is selected such that a space which accommodates the thickened portion of a compact cassette in the region of the cassette which is adjacent and opposite to a recording head when the cassette is in use is provided at least at one side of said bottom.

44. The apparatus of claim 41 wherein said slider member bottom has a plane surface parallel to said housing floor, said surface being spaced from said housing floor.

45. The apparatus of claim 44 wherein said spring means comprises a helical compression spring and spring guide means integral with said housing, said spring guide means being positioned so as to be disposed in the space between said slider member bottom and said housing floor.

46. The apparatus of claim 45 wherein the width of said slider member bottom is selected such that a space which accommodates the thickened portion of a compact cassette in the region of the cassette which is adjacent and opposite to a recording head when the cassette is in use is provided at least at one side of said bottom.

47. Apparatus as defined in claim 46 wherein said latch member and said key form an integral subassembly, said subassembly being connected by said cross-piece to said slider member bottom.

48. The apparatus of claim 41 wherein said spring means comprises a helical compression spring and spring guide means integral with said housing, said spring guide means being positioned so as to be disposed between said slider member bottom and said housing floor.

49. The apparatus of claim 41 wherein said cross-piece is of torsion-resistant configuration.

50. Apparatus for the storage of cassettes containing recording media comprising:
a housing, said housing being open at one narrow side and having a floor, said housing open side defining a plane which is generally transverse to said floor, said housing including a pair of internal guide rails which are integral with said floor, said guide rails extending in a direction which is generally transverse to said plane, said guide rails cooperating with said floor to define open-sided guide channels;
a slider member, said slider member having a front wall, a rear wall and a bottom which extends between said front and rear walls, said bottom being substantially narrower than said housing floor in a direction transverse to said rails, said slider member further having guide bars extending from said bottom, said guide bars being received in said guide channels and overlapped by said housing guide rails whereby said slider member is guided for movement relative to said housing;
spring means for biasing said slider member in the direction of said housing open side;
stop means for limiting the motion of said slider member in the direction of said spring means bias;
retaining projections extending from said bottom of said slider member in a direction which is away from said housing floor, said retaining projections being sized and shaped to receive and lock against rotation the winding hubs of a recording media cassette inserted in said slider member, said projections being arranged one behind the other in the direction of movement of the slider member, the length of said guide rails and guide bars and the position of said stop means being selected such that both of said retaining projections are displaced outwardly with respect to said plane when said slider member is positioned at its limit of movement under the influence of said biasing spring means; and
manually releasable locking means for retaining said slider member in said housing against the bias of said spring means, said locking means including a latch member integrally formed with said slider member and a cooperating indentation in said housing, said locking means further including a key integrally formed with said slider member and adapted to release said latch member from said indentation upon manual actuation, said key being disposed centrally with respect to said slider member front wall and being connected to said slider member bottom by means of a box-like intermediate piece.

51. The apparatus of claim 50 wherein said bottom of said slider member has an inverted U-shaped profile, said guide bars extending from the free U-ends parallel to the U-base.

52. The apparatus of claim 51 wherein the width of said slider member bottom is selected such that a space which accommodates the thickened portion of a compact cassette in the region of the cassette which is adajcent and opposite to a recording head when the cassette is in use is provided at least at one side of said bottom.

53. The apparatus of said claim 50 wherein the base of the U-shape of said slider member bottom defines a plane surface parallel to said housing floor, said plane surface being spaced from said housing floor by a first distance.

54. The apparatus of claim 53 wherein said spring means comprises a helical compression spring and spring guide means integral with said housing, said spring guide means being positioned so as to be disposed in the space between said bottom of said slider member and said housing floor.

55. Apparatus for the storage of cassettes containing recording media comprising:
a housing, said housing being open at one narrow side and having a floor, said housing open side defining a plane which is generally transverse to said floor, said housing including a pair of internal guide rails which extend generally transverse to said plane, said guide rails each cooperating with said floor to define an open-sided guide channel;
a slider member, said slider member having a front wall, a rear wall and a bottom which extends between said front and rear walls, said slider member bottom comprising at least a central part including a plate shaped portion having a first planar side which faces said housing floor and a second planar side which faces from said housing floor, both of said slider member central part sides extending substantially parallel to said housing floor, said slider member further having guiding bar means cooperatively interengaged with said housing guide channels whereby said slider member is guided for linear movement relative to said housing, said guiding bar means including guide bars which are spaced laterally from and oriented generally parallel with respect to said central part, a portion of at least one of said guiding bar means being positioned closer to said housing floor than is the said first planar side of said central part;

spring means for biasing said slider member in the direction of said housing open side;

stop means for limiting the motion of said slider member in the direction of said spring means bias;

manually releasable locking means for retaining said slider member in said housing against the bias of said spring means;

said housing having a rear wall opposite its open side, said rear wall extending generally parallel to said plane;

said spring means comprising a helical spring interposed between said housing rear wall and said slider member rear wall;

spring guiding means extending from said housing bottom, said spring guiding means being at least in part disposed between said housing bottom and said at least one slider member central part first side when said slider member is inserted to its limit of motion in said housing toward said housing rear wall; and retaining projections extending from said central part of said bottom of said slider member in a direction which is away from said housing floor, said retaining projections being sized and shaped to receive and lock against rotation the winding hubs of a recording media cassette inserted in said slider member, said projections being arranged one behind the other in the direction of movement of the slider member, the length of said guide rails and guiding bars and the position of said stop means being selected such that both of said retaining projections are displaced outwardly with respect to said plane when said slider member is positioned at its limit of movement under the influence of said biasing spring means.

56. An apparatus set forth in claim 55 wherein said slider member bottom further includes at least one lateral part.

57. An apparatus as set forth in claim 56 wherein said locking means includes latch means respectively engageable and disengageable between said housing and said slider member, said latch means being adapted for automatic engagement upon said slider member being moved into said housing, and wherein said slider member has key means operatively connected to said latch means for disengaging said latch means upon manual actuation of said key means.

58. An apparatus as set forth in claim 57 wherein said key means is integrally formed with said slider member bottom lateral part.

59. An apparatus as set forth in claim 55 wherein said slider member bottom includes additional lateral parts.

60. An apparatus as set forth in claim 59 wherein said locking means includes latch means respectively engageable and disengageable between said housing and said slider member, said latch means being adapted for automatic engagement upon said slider member being moved into said housing, and wherein said slider member has key means operatively connected to said latch means for disengaging said latch means upon manual actuation of said key means.

61. An apparatus as set forth in claim 60 wherein said key means is integrally formed with one of said lateral slider member bottom parts.

62. An apparatus as set forth in claim 55 wherein said plate shaped portion second plane is spaced from an inner face of said housing bottom by a distance commensurate with a thickened lateral dimension of a cassette to be received in said apparatus.

63. An apparatus as set forth in claim 55 wherein said guiding bar members are provided at lateral extensions of said plate shaped portions, said extensions extending substantially orthogonally with respect to said faces in direction to said housing bottom whereby said central slider member bottom part assumes an inverted U-shaped profile.

64. An apparatus as set forth in claim 55 wherein said locking means include latch means respectively engageable and disengageable between said housing and said slider member.

65. An apparatus as set forth in claim 64 wherein said latch means is adapted for automatic engagement upon said slider member being moved into said housing.

66. An apparatus as set forth in claim 65 wherein said slider member has a key means operatively connected to said latch means so to disengage the latter upon manual actuation of said key means.

67. An apparatus as set forth in claim 66 wherein said key means is integrally formed with said slider member.

68. An apparatus as set forth in claim 67 wherein said key means is integrally formed with said slider member central part.

69. The apparatus of claim 55 wherein said spring guiding means comprises:

an arcuate member mounted on said housing floor, said arcuate member having a configuration which is in part generally complementary to the outer diameter of said helical spring for preventing the buckling of said spring during compression thereof.

70. The apparatus of claim 55 wherein said guiding bar means guide bars engage respective of said housing guide rail defined guide channels and wherein said guide channels are disposed to either side of and extend at least partly along the length of said spring guiding means.

71. The apparatus of claim 70 wherein said spring guiding means comprises:

an arcuate member mounted on said housing floor, said arcuate member having a configuration which is in part generally complementary to the outer diameter of said helical spring for preventing the buckling of said spring during compression thereof.

* * * * *